United States Patent [19]

Sasaki

[11] 4,275,687

[45] Jun. 30, 1981

[54] PREHEATING UNIT FOR DOMESTIC HOT WATER SUPPLY

[76] Inventor: Jack S. Sasaki, 3231 Wellington Ave., Vancouver, British Columbia, Canada

[21] Appl. No.: 88,924

[22] Filed: Oct. 29, 1979

[30] Foreign Application Priority Data

Oct. 31, 1978 [CA] Canada .................................. 315250

[51] Int. Cl.³ .............................................. F22B 33/00
[52] U.S. Cl. ................................... 122/20 B; 126/364
[58] Field of Search .................... 122/20 A, 20 B, 50, 122/84, 85, 47, 48, 137, 138, 160, 421; 126/364, 365, 391; 165/158, DIG. 2

[56] References Cited

U.S. PATENT DOCUMENTS

| | | | |
|---|---|---|---|
| 971,296 | 9/1910 | Meyer | 122/20 B |
| 1,807,481 | 5/1931 | Klein | 122/20 B |
| 2,189,749 | 2/1940 | Windheim et al. | 122/20 B |
| 3,793,992 | 2/1974 | Marquez | 122/20 B |
| 4,103,735 | 8/1978 | Warmer | 122/20 B |
| 4,222,349 | 9/1980 | Kadan et al. | 122/20 B |

*Primary Examiner*—Edward G. Favors
*Attorney, Agent, or Firm*—Townsend and Townsend

[57] ABSTRACT

A preheating unit having a water tank provided with bottom, side and top walls. The tank is fitted with a cold water supply pipe and a warm water delivery pipe. A casing encloses the tank and has a side wall spaced from the side wall of the tank to provide a substantially annular insulating space therebetween. A plurality of inner tubes extend longitudinally through the tank and an outer tube is secured to the bottom and top walls to enclose each inner tube. The inner and outer tubes are spaced apart to define annular spaces therebetween. A lower adaptor on the casing connects a first pipe section to the pipe in communication with the inner tubes. An upper adaptor on the casing connects a second pipe section to the pipe in communication with both the inner tubes and the annular spaces. The arrangement enables heat to be extracted from fluid gases and transferred to a domestic water supply with a minimum amount of harmful condensate collecting in the unit and this amount subsequently is evaporated and discharged to atmosphere.

6 Claims, 4 Drawing Figures

U.S. Patent  Jun. 30, 1981  Sheet 1 of 2  4,275,687
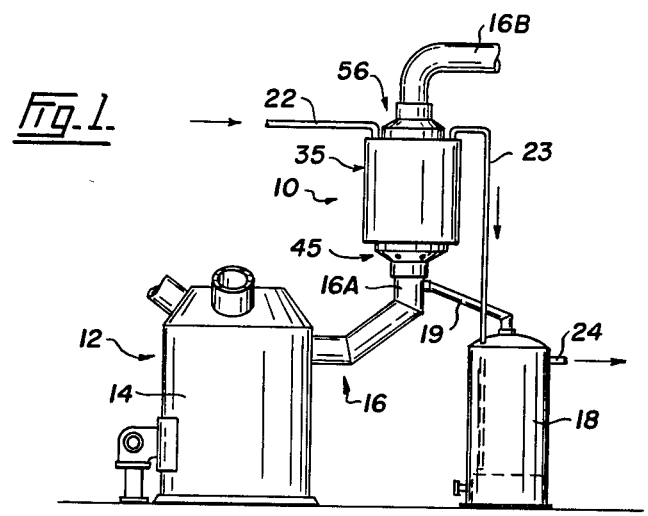
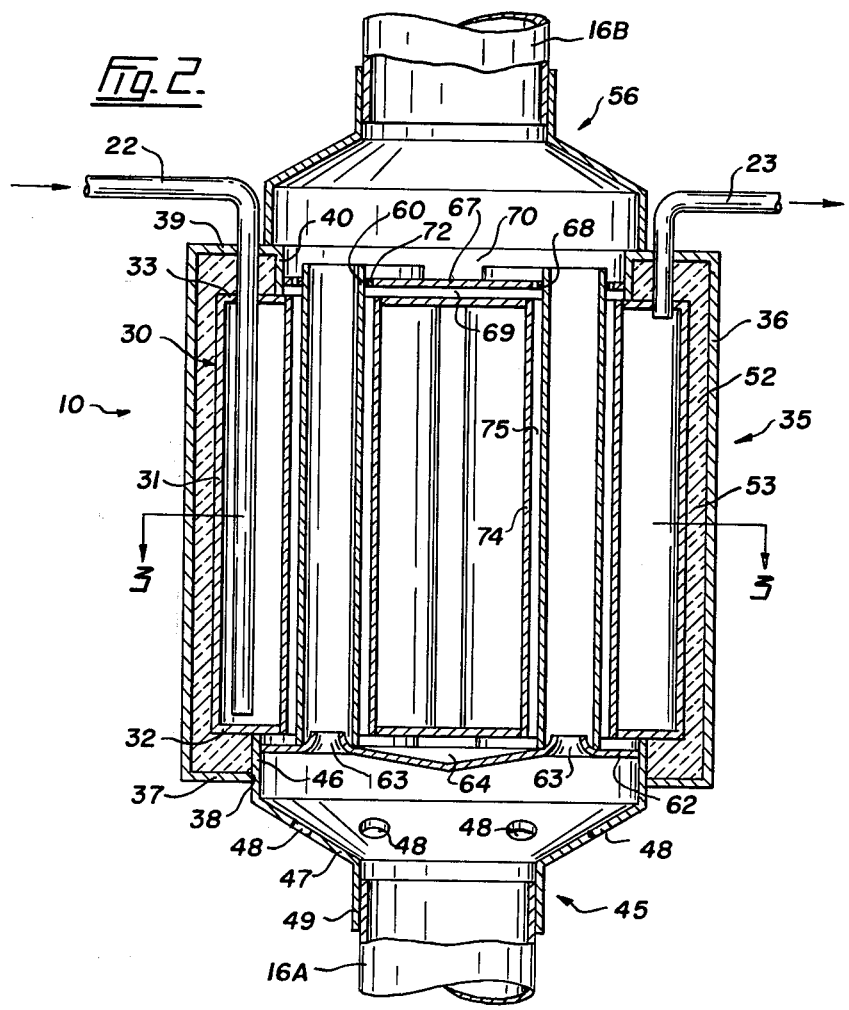

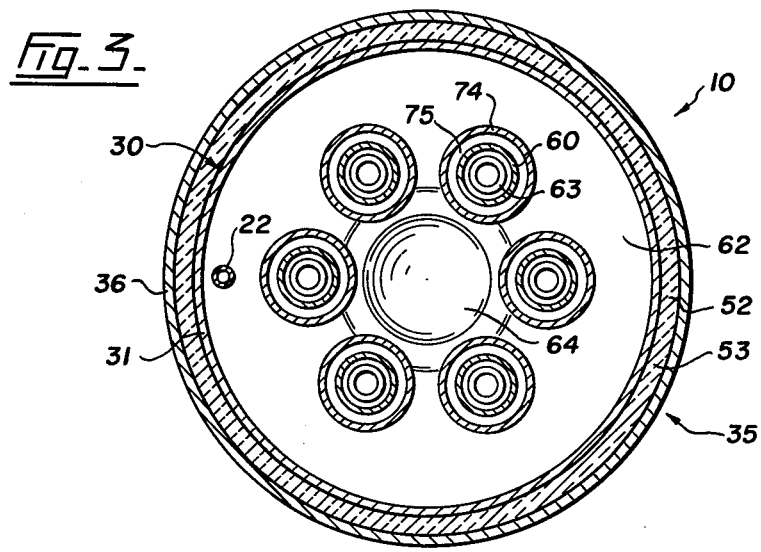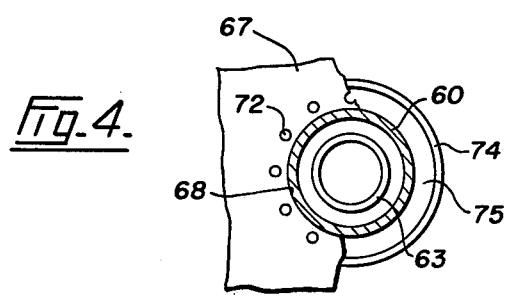

PREHEATING UNIT FOR DOMESTIC HOT WATER SUPPLY

FIELD OF THE INVENTION

My invention relates to a preheating unit particularly intended for use as part of a domestic hot water supply stream.

DESCRIPTION OF PRIOR ART

The products of combustion which are discharged during the operation of furnace contain hot gases which normally are lost to atmosphere and, in this era of fuel shortages and high fuel costs, this heat loss is now no longer acceptable. A number of attempts have been made to make use of such wasted heat but other known arrangements are not too efficient and tend to interfere with the normal operation of either the furnace or the heater responsible for supplying hot water to the household.

The prior art known to applicant includes the following United States Pat. Nos: 568,852 issued to Z. D. Johns on Oct. 6, 1896; 576,763 issued to F. B. Peterson on Feb. 9, 1897; 971,296 issued to F. W. Meyer on Sept. 27, 1910; 1,087,717 issued W. A. Brewster on Feb. 17, 1914; 2,189,749 issued to F. T. Windheim et al on Feb. 13, 1940; 2,481,480 issued to D. W. Main on Sept. 6, 1949; 2,620,431 issued to W. L. Shepheard on Dec. 2, 1952; 3,580,225 issued to John W. Coy on May 25, 1971; and Canadian Patent No. 299,578 issued to Louis D. Summers on Apr. 22, 1930.

SUMMARY OF THE INVENTION

When fluid gases from a gas-fired furnace are used to heat water in the manner contemplated by the present invention, the moisture contained in the fuel present problems. Any heat exchanger such as the present unit meet certain requirements as set down by the Canadian Gas Code and other Government regulations. For example, the preheating unit must not collect excessive moisture which is contaminated by the products of combustion and discharge this contaminated liquid into a sewage system. Such contaminated liquid should be completely evaporated within the unit itself and, to accomplish this, the temperature of the flue gases must not be reduced below substantially 270° F. by the preheater otherwise condensation will take place and pollution will occur contrary to the above mentioned regulations. Furthermore, if condensate which contains acid is allowed to collect in any part of the preheating system including the preheater, any metal parts in the system are subjected to the action of the acid and the operating life of those parts is correspondingly reduced.

I overcome the disadvantages inherent in the heat extractors used for this particular purpose by providing a preheating unit which will operate quietly and effectively. The unit is constructed so as to greatly reduce the tendency for condensate to form and any small amounts of moisture which might collect during initial operation of the heating unit is quickly evaporated and dispensed to atmosphere with the discharging flue gases.

To achieve these and other desirable results, my invention contemplates a preheating unit which comprises a water tank having bottom, side and top walls; a cold water supply pipe and a warm water delivery pipe connected to the tank, a casing enclosing the tank and having a side wall spaced from the side wall of the tank to provide a substantially annular insulating space therebetween, a plurality of inner tubes extending longitudinally through the tank, an outer tube secured to the bottom and top walls to enclose each inner tank, said inner and outer tubes being spaced apart to provide annular spaces between said tubes, a lower adaptor on the casing for connecting a first pipe section to the tank in communication with the inner tubes, and an upper adaptor on the casing for connecting a second pipe section to the tank in communication with both the inner tubes and the annular spaces.

BRIEF DESCRIPTION OF DRAWINGS

The preheating unit for domestic hot water supply is illustrated in the accompanying drawings in which:

FIG. 1 is a side elevation of a domestic hot water heating system incorporating the present preheating unit, FIG. 2 is a vertical section of the preheating unit, FIG. 3 is a horizontal section taken on the line 3—3 of FIG. 2, and FIG. 4 is a horizontal detail section, part in elevation, and showing a vent hole arrangement for a top plate of the preheating unit.

DESCRIPTION OF THE PREFERRED EMBODIMENTS

Referring first to FIG. 1, the numeral 10 indicates a preheating unit constructed in accordance with the present invention and forming part of a heating system generally indicated at 12. The system 12 may include an oil or gas fired furance 14 which in many households is simply a unit for heating air for delivery to separate rooms of the house. A flue pipe 16 connects the furnace 14 to a chimney, (not shown) and the suitably supported unit 10 is connected into this pipe near a conventional water heater 18. Preferably, the system 12 would include a reservoir tank of an appropriate size and a network of pipes connecting the tank to the unit 10 and the heater 18 but such a reservoir tank and network have been purposely omitted since the arrangement is well known and the present invention relates to the preheating unit itself. The heater 18 generally is located alongside the furnace to provide a supply of hot water for the home. Like the furnace, the heater may use oil or gas as a fuel although many are electrically powered but usually all such heaters have a vent pipe 19 which connects the dome of the heater to the flue pipe 16.

The unit 10 receives water to be preheated through an inlet pipe 22 and this water when raised in temperature is delivered to the heater 18 through an outlet pipe 23. After being heated further to the required temperature, hot water leaves the heater 18 through a pipe 24 for delivery eventually to the kitchen and bathroom of the home.

Referring now to detail FIGS. 2, 3 and 4, the preheating unit generally indicate at 10 will be seen to comprises a tank 30 having a cylindrical side wall 31 as well as bottom and top walls 32 and 33.

A casing 35 partly encloses the tank 30; the casing having a cylindrical side wall 36, an inwardly projecting bottom flange 37 defining an opening 38, and a top flange 39. The flange 39 connects with a vertical inner flange 40 which extends downwardly to contact the top wall 33 of the tank.

Bottom wall 32 of the tank abuts the upper edge of a funnel-like adaptor 45 having an upper end 46 which closely fits the opening 38 in the bottom flange 37 of the casing. The lower adaptor has a sloping wall 47 which is provided with a plurality of circumferentially spaced air inlet holes 48, these holes serving to admit surrounding air into the adaptor. The previously mentioned flue 16 which normally extends from the furnace to the chimney has a section 16A connected to a relatively small-diameter lower end 49 to the adaptor. It will be apparent the adaptor 45 could be integrally formed with the casing 35 if so desired.

The structure thus far described provides an annular space 52 between the walls of the tank 31 and the corresponding parts of the casing 35. This space 52 is tightly packed with a suitable thermal insulating material 53.

Top flange 39 of the casing is abutted by another funnel-like adaptor 56. This upper adaptor, which may also be integral with the casing, is inverted to connect a flue portion 16B to the unit 10. The hot gases which flow between the portion 16A and 16B of the flue are conducted through the tank 31 by means of inner tubes 60.

As best shown in FIG. 3, the tubes 60 are arranged circumferentially about the tank 31. The lower ends of the inner tubes are supported by a plate 62 which is carried on the upper end 46 of the adaptor. The metal plate 62 is provided with an opening 63 in register with the lower end of each inner tube. Preferably, the side edge of each opening 63 is shaped as shown in FIG. 2 to project a short distance into the lower end of the superposed tube 60. Plate 62 is spaced from the underside of the bottom wall 32 of the tank to provide a well 64 and preferably a central portion of this well projects downwardly as shown in FIG. 2.

The upper end of the tubes 60 project above the top wall 33 of the tank. A plate 67 carried by the inner flange 40 extends parallel to the top wall 33 to provide a support for the upper end of the tubes 60, the tubes projecting through openings 68 formed in the top plate and being firmly secured therein. Plate 67 is spaced from the top wall 33 of the tank to provide a shallow chamber 69 and is positioned below the top flange 39 of the casing to provide a recess 70. In FIG. 2 and particularly in FIG. 4, top plate 67 will be seen to have a circle of small vent holes 72 which surround the upper end of each tube 60.

The tubes 60 are each enclosed by an outer tube 74 the opposite ends of which are secured to the walls 32 and 33 of the tank. These outer tubes are separated from the inner tubes 60 to provide annular spaces 75 which are opened at their lower ends to the well 64. The upper ends of the spaces 75 communicates directly with the chamber 69 and are in communication with the recess 70 through the vent holes 72.

The inlet pipe 22 conducts cold water to the tank 31 as previously described and this water is heated by the flue gases passing through the inner tubes 60 before the water carried away by the outlet pipe 23. The flow of gases through the tubes 60 is speeded up by the ambient air which enters the unit through the inlet holes 48. The heat-containing flue gases flowing through the inner tubes 60 are separated from the outer tubes 74 by the air spaces 75. It is the outer tubes 74 which are in actual contact with the relatively cool water within the tank 31. Air within the spaces 75 is heated by the passing gases and it is this heated air which in turn heats the tank water through the outer tubes 74. The exchange of heat will sometimes cause condensation to form on the adjacent surfaces of the tubes which define the air spaces 75 and this usually occurs when the unit 10 first starts to extract heat from the flue gases and the water within the tank 31 is quite cool. The condensate, if excessive, will run down the tube surfaces and collect in the well 64. However, all the condensate is soon evaporated by continued operation of the unit 10 and the resulting vapor is carried away through the spaces 75, the chamber 69, and the vent holes 72 into the recess 70 where it is picked up by gas stream and is conducted to the chimney through the adaptor 56 and flue section 16B. Thus, the preheating unit 70 operates to extract from the flue gases sufficient heat to warm up the water in the tank without reducing the temperatures of those gases below substantially 270° F. Condensate does not therefore tend to accumulate and become contaminated so as to cause pollution problems if disposed off into the public sewer system. Furthermore, any accumulated moisture has an acid content which would be extremely damaging to metallic parts of the unit if it were not drawn off and evaporated into the stream discharging into the chimney and this corrosion problem which so reduces the operating life of conventional pieces of equipment of this type is avoided when the preheater unit 10 is employed.

I claim:

1. A preheating unit comprising a water tank having a bottom, side and top walls; a cold water inlet pipe and a warm water outlet pipe connected to the tank, a casing enclosing the tank and having a side wall spaced from the side wall of the tank to provide a substantially annular space therebetween, a plurality of inner tubes extending longitudinally through the tank, an outer tube secured to the bottom and top wall to enclose each inner tube, said inner and outer tubes being spaced apart to provide annular spaces between said tubes, a lower adaptor on the casing for connecting a first tank section to the pipe in communication with the inner tubes, and an upper adaptor on the casing for connecting a second pipe section to the tank in communication with both the inner tubes and the annular spaces.

2. A preheating unit as claimed in claim 1, in which said lower adaptor has a plurality of air inlets for admitting ambient air.

3. A preheating unit as claimed in claim 2, in which said lower adaptor has a bottom plate spaced from the bottom wall of the tank and shaped to provide a well communicating with the annular spaces, said bottom plate having an opening in register with a lower end of each inner tube.

4. A preheating unit as claimed in claim 1, and including an upper plate supported above the top wall of the tank to provide a chamber around the inner tubes, said upper plate having air vent holes providing the only communication between the annular spaces and the upper adaptor.

5. A preheating unit as claimed in claims 1, 3 or 4, and including insulating material within the annular space between the tank and the casing.

6. A preheating unit comprising a water tank having bottom, side and top walls; a cold water inlet pipe and a warm water outlet pipe connected to the tank, a casing enclosing the tank and having a side wall spaced from the side wall of the tank to provide a substantially annular space therebetween, insulating material filling the annular space, a plurality of inner tubes extending longitudinally through the tank, an outer tube secured to the bottom and top walls to enclose each inner tube, said inner and outer tubes being spaced apart to provide annular spaces between said tubes, a lower adaptor on the casing for connecting a first pipe section to the tank in communication with the inner tubes, said lower adaptor having a plurality of air inlets for admitting ambient air, a bottom plate extending across the lower adaptor spaced from the bottom wall of the tank to provide a well communicating with the annular spaces, said bottom plate having an opening in register with a lower end of each inner tube, an upper adaptor on the casing for connecting a second pipe section to the tank in communication with both the inner tubes and the annular spaces, and an upper plate supported above the top wall of the tank to provde a chamber around the inner tubes, said upper plate having air vent holes providing the only communication between the annular spaces and the upper adaptor.

* * * * *